United States Patent [19]

Lau

[11] Patent Number: 5,485,592
[45] Date of Patent: Jan. 16, 1996

[54] WRITE BACK CACHE CONTROLLER METHOD AND APPARATUS FOR USE IN A SYSTEM HAVING A CPU WITH INTERNAL CACHE MEMORY

[75] Inventor: Tim Y. T. Lau, Vancouver, Canada

[73] Assignee: Video Technology Computers, Ltd., Tai Po, Hong Kong

[21] Appl. No.: 90,517

[22] Filed: Jul. 12, 1993

Related U.S. Application Data

[63] Continuation-in-part of Ser. No. 864,535, Apr. 7, 1992, abandoned.

[51] Int. Cl.$^6$ .................................................. G06F 13/18
[52] U.S. Cl. .................. 395/470; 395/280; 395/485; 364/243.44; 364/964.32; 364/969; 364/DIG. 1
[58] Field of Search ................ 395/400 MS, 425 MS; 364/200 MS, 900 MS

[56] References Cited

U.S. PATENT DOCUMENTS

| | | | |
|---|---|---|---|
| 5,023,776 | 6/1991 | Gregor | 364/200 |
| 5,091,846 | 2/1992 | Sachs et al. | 395/250 |
| 5,119,485 | 6/1992 | Ledbetter, Jr. et al. | 395/425 |
| 5,155,824 | 10/1992 | Edenfield et al. | 395/425 |
| 5,168,560 | 12/1992 | Robinson et al. | 395/425 |
| 5,210,848 | 5/1993 | Liu | 395/425 |
| 5,261,109 | 11/1993 | Cadambi et al. | 395/725 |
| 5,276,852 | 1/1994 | Callander et al. | 395/425 |
| 5,317,720 | 5/1994 | Stamm et al. | 395/425 |
| 5,319,766 | 6/1994 | Thaller et al. | 395/425 |
| 5,325,504 | 6/1994 | Tipley et al. | 395/425 |
| 5,335,335 | 8/1994 | Jackson et al. | 395/400 |
| 5,345,576 | 9/1994 | Lee et al. | 395/425 |
| 5,353,415 | 10/1994 | Wolford et al. | 395/325 |

*Primary Examiner*—Reba I. Elmore
*Attorney, Agent, or Firm*—Dick and Harris

[57] ABSTRACT

A cache controller apparatus for controlling an external write back cache memory and arbitrating a system bus, which interconnects a microprocessor having an internal write back cache memory, an external cache memory, a main memory, and one or more DMA controllers. The cache controller apparatus controls the write-back cycle of the external cache by imitating a microprocessor memory write cycle. The cache controller also insures the cache consistency of the cache internal to the microprocessor. When a DMA controller or ISA bus master is master of the system bus and asserts a valid memory command, the cache controller causes the DMA controller or ISA bus master to wait and the microprocessor to perform an internal cache inquiry to determine if the internal cache memory contains modified data to be stored at the memory location desired by the DMA controller. If the cache line needs to be written-back, the microprocessor signals the cache controller, which, in turn, provides the microprocessor with temporary mastership of the system bus, such that it can write back the cache line to the system. The cache controller invalidates a corresponding cache line in the external cache memory if it is valid. Finally, the external bus master is allowed to continue with the memory access.

5 Claims, 1 Drawing Sheet

WRITE BACK CACHE CONTROLLER METHOD AND APPARATUS FOR USE IN A SYSTEM HAVING A CPU WITH INTERNAL CACHE MEMORY

This application is a continuation-in-part of application Ser. No. 07/864,535, filed Apr. 7, 1992 now abandoned.

BACKGROUND OF THE INVENTION

The present invention relates generally to the control and storage of digital data in a high speed microcomputer system, and in particular, to a method and apparatus for a write back cache controller accommodating a cache memory internal to a system CPU through controlling the system bus and CPU.

The processing speed of microprocessors has increased substantially over the last decade. Years ago this increased processing speed made the addition of smaller, faster and more expensive cache memories to computer system necessary. There are numerous design possibilities for cache memories: direct-mapped or set-associative; write-back or write-through; etc. Much of the savings in high speed systems comes through the use of a write-back (sometimes referred to as copy-back) cache. This type of cache includes memory for data and for status information and a cache controller to handle memory access requests, such that no data is unintentionally lost.

Although the addition of cache memory to main memory met many speed requirements, it became apparent that even the external cache was not enough. The system bus which links the microprocessor to the cache memory contributed to the less than desirable response time. Designers thus began to place a cache memory "internal" to the microprocessor, thus avoiding the bus. For instance, the INTEL CORPORATION of Santa Clara, Calif. produces the 486 family of microprocessors (486SX, 486DX and 486DX2) which all include a write-through cache memory on the NP chip, thereby substantially reducing the system bus load. However, because each of these microprocessors utilize a write-through protocol, every write to the internal cache prompts a memory write on the system bus and incurs associated overhead. If a write-back protocol were to be utilized in a microprocessor internal cache, this would further decrease the number of system bus cycles. However, in a system containing an external cache memory and devices capable of direct memory access or external bus master cache coherency concerns arise.

The INTEL 486 family of microprocessors is utilized in the most popular and widely distributed computer systems. As a result of the popularity of the INTEL 486 family, the 486 bus definition, i.e. the defined signals and their timing, have become an industry standard with more and more chip set and peripheral manufacturers designing their products to work within this definition. Some more pertinent signals available in the 486 bus definition include:

BREQ—The internal cycle pending signal indicates that the microprocessor has internally generated a bus request. BREQ is generated whether or not the microprocessor is driving the bus.

RDY/—The non-burst ready input indicates that the current bus cycle is complete. RDY/ indicates that the external system has presented valid data on the data pins in response to a read or that the external system has accepted data from the microprocessor in response to a write. RDY/ is ignored when the bus is idle and at the end of the first clock of the bus cycle.

BRDY/—The burst ready input performs the same function during a burst cycle that RDY/ performs during a non-burst cycle. BRDY/ is ignored when the bus is idle and at the end of the first clock in a bus cycle. BRDY/ is sampled in the second and subsequent clocks of a burst cycle.

BLAST/—The burst last signal indicates that the next time BRDY/ is returned the burst bus cycle is complete.

LOCK/—The bus lock pin indicates that the current bus cycle is locked. LOCK/ goes active in the first clock of the first locked bus cycle and goes inactive after the last clock of the last locked bus cycle. The last locked cycle ends when ready is returned.

PLOCK/—The pseudo-lock pin indicates that the current bus transaction requires more than one bus cycle to complete. Examples of such operations are floating point long reads and writes (64 bits), segment table descriptor reads (64 bits), in addition to cache line fills (128 bits). The microprocessor will drive PLOCK/ active until the addresses for the last bus cycle of the transaction have been driven regardless of whether RDY/ or BRDY/ have been returned.

ADS/—The address status output indicates that a valid bus cycle definition and address are available on the cycle definition lines and address bus. ADS/ is driven active in the same clock as the addresses are driven.

EADS/—This signal indicates that a valid external address has been driven onto the microprocessor address pins. This address will be used to perform an internal cache invalidation cycle.

M/IO, D/C, W/R—The bus definition signals are not driven during bus hold and follow the timing of the address bus. INTEL has proposed an approach to utilizing an internal writeback cache, which is being implemented in the INTEL OVERDRIVE processor—a companion chip to the 486DX2. Rather than the standard dirty and validity bit protocol utilized in write-back cache memories, a MESI protocol is used. MESI has four states: Modified, Exclusive, Shared and Invalid. A modified cache line is only available in the internal cache and is different from the main memory (or dirty under the old protocol). An exclusive cache line is available only in the internal cache and is the same as main memory. A shared cache line may exist in an external, as well as the internal cache. An invalid cache line is not available in the internal cache.

It is thus an object of the present invention to provide a cache controller which can insure the coherency of both internal and external caches and main memory.

It is an associated object to provide a cache controller which mimics the microprocessor, such that cache functions are transparent to the system, thus avoiding the need for special controllers to handle special cycles.

These and other objects of the invention will become apparent in light of the present specification and drawings.

SUMMARY OF THE INVENTION

The present invention comprises a cache controller apparatus for controlling an external write back cache memory and arbitrating a system bus and method for monitoring activity on the system bus to provide cache coherency for a write-back cache internal to a microprocessor. The system bus which contains a data bus, an address bus and a control bus, links together devices in a system including: a microprocessor unit having an internal write-back cache memory; an external cache memory; a main memory; and one or more external bus masters. In a preferred embodiment, the cache controller apparatus is configured such that the external cache memory may be located directly on the data bus. Each of the one or more external bus masters are capable of direct memory access and may comprise DMA controllers.

The cache controller apparatus includes means for determining the state of the external cache memory to the address associated within the current microprocessor memory access command. Essentially, the determining means serves to determine if the memory access command necessitates an external cache write-back cycle, which occurs where valid, dirty cache data would be replaced by the current bus cycle command.

The cache controller also includes means for maintaining status information for the plurality of cache lines contained within the external cache memory. This status information is contained in dirty and validity bits. In a preferred embodiment of the invention, each cache line contains four data words and one dirty and one validity bit for each data word stored in the external cache.

The cache controller additionally includes means for servicing a microprocessor memory access request when the external cache write-back cycle is not necessary. The servicing means provides control signals for cache memory read and cache memory write, such that data contained in the cache memory may be provided to the microprocessor unit.

The cache controller also includes means for directing an external cache write-back cycle. The directing means generating signals which mimic those of the microprocessor unit such that the write-back is simply viewed as a system bus cycle controlled by the microprocessor unit, thus, simplifying the design of the main memory controller.

The cache controller further includes means for monitoring activity on the system bus specifically looking for a valid memory access command issued by one of the one or more external bus masters. This monitoring means further causes the microprocessor unit to perform an internal cache inquiry—a determination of whether the most recent version of the information requested by the external bus master is contained in the internal cache memory.

The cache controller finally includes means for temporarily transferring mastership of the system bus from the one of the one or more external bus masters to the microprocessor unit, such that the microprocessor unit can perform a write-back cycle when the most recent version of the information requested by the external bus master is contained in the internal cache memory.

In operation, system bus monitoring occurs when one of the one or more external bus masters, as master of the system bus, asserts a valid memory command. This DMA assertion is directed by the cache controller which causes the microprocessor unit to perform an internal cache inquiry, to determine if the internal cache memory contains the most recent version of the information requested by the external bus master. During this time, the cache controller forces the one of the one or more external bus masters to wait through the introduction of wait states. If the most recent data is in the internal cache, the microprocessor unit notifies the remainder of system of a pending microprocessor write back.

Upon seeing the need for an internal cache write-back, the cache controller provides the microprocessor unit with temporary mastership of the system bus and invalidates any corresponding cache line in the external cache memory if it is valid. Temporary mastership is provided by deasserting the external bus request signal and reasserting it once the write-back cycle has begun, thus, resulting in the return of system bus mastership to the external master immediately following the microprocessor write-back cycle.

DETAILED DESCRIPTION OF THE DRAWINGS

Figure 1:
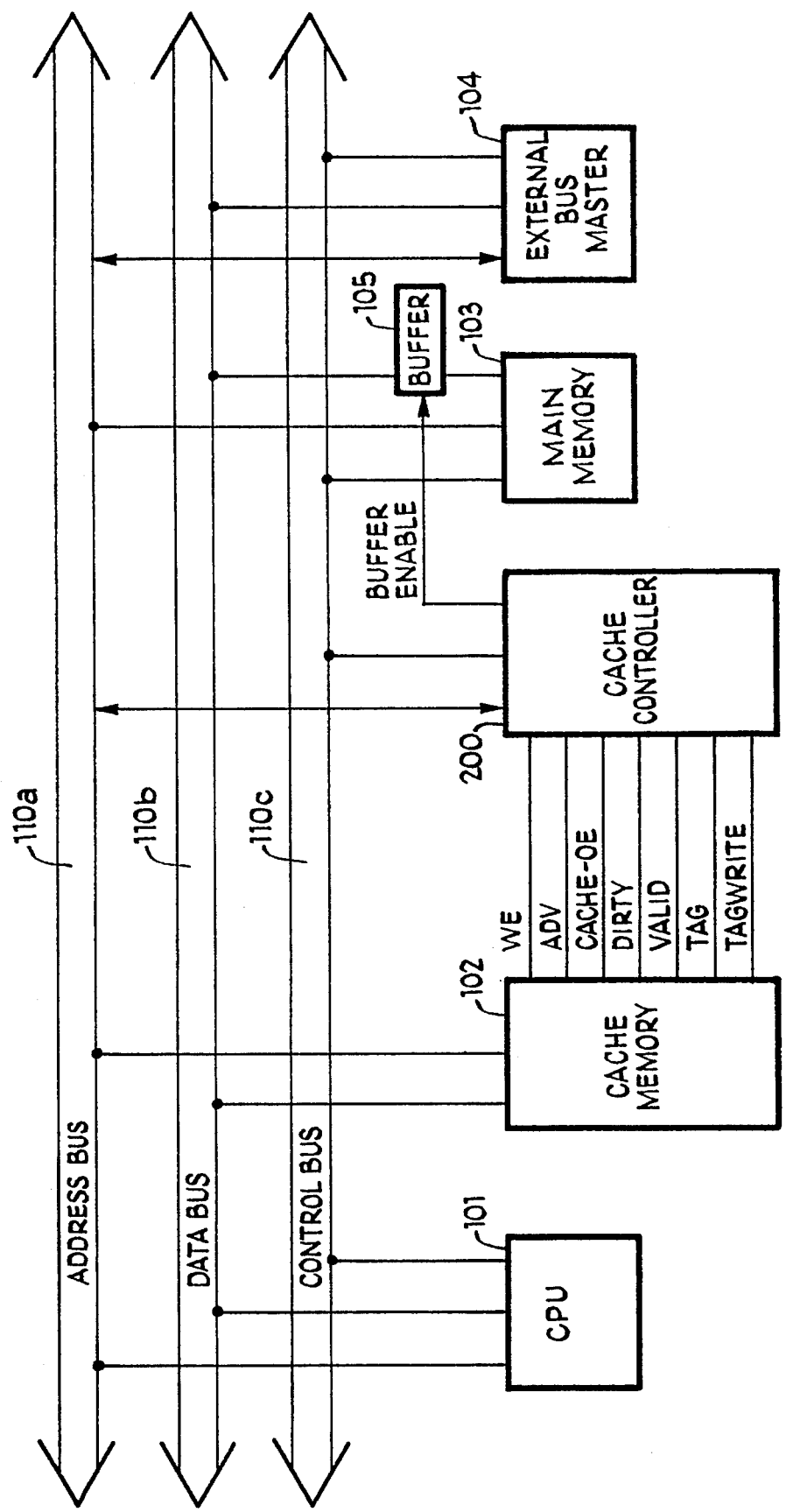
FIG. 1 of the drawings is a block diagram of a one potential system containing the write back cache controller apparatus, specifically showing a microprocessor with an internal write-back cache memory, an external cache memory, main memory, one external bus master and a system bus.

While this invention is susceptible of embodiment in many different forms, one specific embodiment is shown in the drawings and will herein be described in detail with the understanding that the present disclosure is to be considered as an exemplification of the principals of the present invention and is not intended to limit the invention to the embodiment illustrated.

FIG. 1 of the drawings is a block diagram of one potential system containing cache controller apparatus 200. The system includes microprocessor 101; external cache memory 102; main memory 103; external bus master 104 and system bus 110. Microprocessor 101 contains an internal write-back cache, such as the proposed INTEL OVERDRIVE processor. The OVERDRIVE processor conforms in other ways to the INTEL 486 bus definition, described above. Most importantly for purposes of the present invention, the OVERDRIVE processor can be immediately forced off the system bus 110 through the assertion of the BOFF signal. Furthermore, the OVERDRIVE processor performs its own cache inquiry cycle upon assertion of the EADS signal. INTEL, however, did not provide the OVERDRIVE processor with its own ability to bus monitor system activity.

Cache memory 102 consists of a data cache, tag cache and status cache. Each of these sub-caches are implemented using SRAM. In a preferred embodiment, each cache line contains four 32-bit data words, an 8/9-bit tag, and a status word comprising four validity bits (one for each data word) and four dirty bits (one for each data word). In this preferred embodiment, the tag comprises the eight most significant bits of the 26-bit (up to PA25) address with the lower 17, 18, 19 or 20 address bits (depending upon the size of cache memory being used to address cache memory 102. In a preferred embodiment the SRAMs are capable of self-timed writes and incorporates an internal burst sequence counter, thus simplifying the external logic needed to drive cache memory 102.

In a preferred embodiment, main memory 103 is comprised of DRAM. Main memory 103 is directly connected to the multiplexed address bus 110a and a portion of control bus 110c, however, it is connected through buffer 105 to data bus 110b. Buffer 105 prevents main memory 103 from responding to command definitions asserted by microprocessor 101 on system bus 110, unless cache controller 200 determines that the response must come from main memory 103.

External bus master 104 may comprise an ISA bus master, a DMA controller, or like device capable of direct memory access. When external bus master 104 needs to perform a memory access it obtains mastership of system bus 110 through the assertion of an external bus request signal. The external bus request signal is received by microprocessor 101, which responds with a system bus grant signal, once system bus 110 is not servicing microprocessor 101. Having obtained control of system bus 110, external bus master 104 performs a bus cycle, which may necessitate a cache access.

Cache controller 200 controls external write back cache memory 102 and arbitrates system bus 110 to provide microprocessor 101 the ability to perform an internal cache write-back cycle. Cache controller 200 has a number of states, which depend upon the command definition, e.g. whether a command results in cache hit or miss and the status of the corresponding dirty bits. Where microprocessor 101 is bus master and a cache hit occurs, cache controller 200 directs external cache memory 102 to service the request depending upon the command definition. Where microprocessor 101 is bus master and a cache miss occurs, the resulting cycle depends upon the status of the cache line, which would be replaced while servicing the command definition.

The status of each cache line is indicated by a number a dirty bits and an equal number of validity bits. As indicated above, in a preferred embodiment, the cache line contains four data words, four dirty bits and four validity bits, such that each data word has its own status information in cache memory 102. The dirty bit indicates whether the information in cache memory 102 differs from that in main memory 103. Where the data to be replaced is valid and dirty, a write-back cycle is necessary. In performing this write-back cycle, cache controller 200 forces microprocessor 101 off system bus 110 utilizing the back off signal, BOFF. Once microprocessor 101 is off system bus 110, cache controller 200 mimics a memory write bus cycle of microprocessor 101, thus making the write-back cycle transparent to the DRAM controller within main memory 103. Once the write-back cycle has completed the written cache lines are reset to clean (not dirty) and microprocessor 101 is allowed back onto system bus 110. Microprocessor 101 will then continue with the aborted cycle, which will no longer require the replacement of dirty cache data.

Where microprocessor 101 sought to write double word information to memory, the write is simply made into external cache memory 102. However, where microprocessor 101 sought to read information, this information must be obtained from main memory 103. Cache controller 200 enables buffer 105 and allows main memory 103 to respond to the read command issued by microprocessor 101. As main memory 103 indicates that valid data is available on data bus 103*b*, cache controller 200 causes cache memory 102 to write the data. Thus, microprocessor 101 and cache memory 102 simultaneously receive the data from main memory 103, such that on future commands, cache memory 102 can service a request from microprocessor 101 for that data.

While the foregoing commands have been issued by microprocessor 101, external bus master 104 may also assert command definitions when it is master of system bus 110. Where this is the case, such commands may alter the content of external cache 102 and may necessitate a write-back cycle from the internal cache.

Cache controller 200 can be thought to carry out a number of different but related functions, which together control external cache memory 102 and arbitrate system bus 110 such that microprocessor 101 can perform its own write-back cycles where necessary. Cache controller 200 includes means for determining the state of external cache memory 102 based upon the address asserted on address bus 110*a* during a microprocessor memory access command. Essentially, the determining means serves to determine if the memory access command necessitates an external cache memory write-back cycle. This status information is maintained by cache controller 200 for the plurality of cache lines contained within external cache memory 102 in the form of dirty and validity bits.

Where the requested data is found in external cache memory 102, cache controller 200 services the memory read or write request. The means for servicing a microprocessor memory access request provides control signals to external cache memory 102, such that data contained therein may be provided to microprocessor 101.

Because of the presence of an internal write-back cache within microprocessor 101, cache controller 200 further includes means for monitoring activity on the system bus 110 looking for a valid memory access command issued by external bus master 104. This monitoring means further causes microprocessor 101 to perform an internal cache inquiry, such that a determination of whether the most recent version of the information requested by external bus master 104 is contained in the internal cache memory may be performed. If the most recent data is internal to microprocessor 101, it needs to be written back before external bus master 104 performs its access. Cache controller 200 temporarily transfers mastership of the system bus from external bus master 104 to microprocessor 101, such that microprocessor 101 can perform the write-back cycle.

In operation, system bus monitoring occurs when external bus master 104, as master of the system bus, asserts a valid memory command. This DMA assertion is noticed by cache controller 200 which causes microprocessor 101 to perform its internal cache inquiry. During this time, cache controller 200 forces external bus master 104 to wait by introducing wait states via an IOWAIT signal, which in turn results in the assertion IOCHRDY#. If the most recent data is in the internal cache, microprocessor 101 notifies the remainder of system 100 through the assertion of HITM of a pending microprocessor write back.

Upon seeing the need for an internal cache write-back, cache controller 200 provides microprocessor 101 with temporary mastership of system bus 110 and invalidates any corresponding cache line in external cache memory 102. Temporary mastership is provided by deasserting the external bus request signal and reasserting it once the write-back cycle has begun, thus, resulting in the return of system bus mastership to external bus master 104 immediately following the microprocessor write-back cycle.

The following signals are utilized within system 100 and, in particular, cache controller 200:

AADS—alternative ADS to control the operation of the SRAM.

ABHLDA—advanced BHLDA control signal. The actual BHLDA control signal is one clock (CLK) delay of ABHLDA.

ABOFF—advance BOFF control. BOFF will be asserted on the next CPUCLK when ABOFF is asserted.

ABWRDY—READY control signal utilized during DRAM burst write cycles.

ACAS—advanced CAS control signal. CAS will be asserted to the DRAM on the next CPUCLK when ACAS is asserted.

ADRAMRDY—advanced DRAMRDY signal generated one CPU clock cycle earlier than DRAMRDY and is used to update the tag bit information during a cache burst line fill.

ADS (CPUADS)—valid bus cycle definition signal generated by microprocessor 101 to time the bus cycle.

ADWRDY—intermediate control signal to control the output of BWRDY. BWRDY is the ready control signal signaling the completion of each burst write cycle.

ALL—indicates whether cache controller 200 needs to compare all 4 bytes contained in the accessed cache line.

Bn—(B0, B1, B2) this signal is to rebuild the internal BLAST# signal during P5 mode (i.e. the OVERDRIVE processor is installed as part of microprocessor 101).

BEn—byte enable signal generated by microprocessor 101.

BHLDA—a latched version of the CPUHLDA signal generated by microprocessor 101, which indicates that microprocessor 101 has given system bus 110 to another bus master.

BLADS—a control signal to control CPU burst write cycle to the external cache memory 102. This is used in combination with BRADS.

BLAST—last burst cycle signal generated by microprocessor 101.

BOFF—(CPU BOFF) back off signal forces microprocessor 101 to immediately back off system bus 110. Deassertion of this signal allows microprocessor 101 to restart its bus cycle.

BOFF1—BOFF1 is the event output of ABOFF, BOFF1 is 'OR'ed with BOFF from cache controller 200 to output BOFF to microprocessor 101.

BOFFADS—valid bus cycle definition signal utilized during external cache write-back cycles.

BOFFBUFEN—write back buffer enable signal enables buffer 105 and is utilized during external cache write-back cycles to drive the address and control buses 110a and 110e.

BOFFDLY—BOFFDLY is a static signal to delay events during cache write back when system 100 is running at 66 MHz.

BOFFREQ—back off bus request indicates that cache controller 200 needs to request control of system bus 110 through the assertion of BOFF.

BRADS—BRADS is the control signal to control CPU burst write cycle to external cache memory 102.

BSRAM—BSRAM is a static signal indicating to external cache memory 102 is comprised of burst SRAM, so a burst write can be operated at zero wait states.

BWA0 & BWA1—addresses MA0 and MA1 in the DRAM controller during CPU burst write to main memory 103. These addresses are pipelined to allow more address setup time.

BWCAS—CAS control signal utilized during DRAM burst write cycle.

BWDRAM—control signal to start a DRAM burst write cycle.

BWRDY—READY control signal to signal the completion of each burst write cycle.

BUFFEN—buffer enable signal enabling data buffer 105 between data bus 110b and main memory 103 to allow a main memory read or write.

BURST—a control signal output from the DRAM controller. When BURST is active, the DRAM controller is undergoing multiple transfer (Burst transfer).

C1 & C2—C1 & C2 are the internal control signals to control the CPU burst write cycle to external cache memory 102.

CACBIT—static signal enabling external cache memory 102.

CACHE—internal cache initialization signal.

CACHEMISS—cache miss signal indicates that the requested data is not available in external cache memory 102.

CACHEOE—external cache memory 102 output enable signal.

CACRDYEN—cache ready enable signal which enables the generation of the READY signal to microprocessor 101.

CHRDY—add more wait states signal utilized during DMA or ISA bus master cycles. During P5 or P24T internal cache snooping, additional wait states are needed if microprocessor 101 needs to perform internal cache write back cycle.

CLK (CPUCLK)—the fundamental system clock. All timing is referenced to the rising edge of CLK.

CMDDLY—this is a static signal to indicate to the system that an additional wait state is needed in the lead off stage.

CPUBRDY—burst cycle ready signal generated by main memory 103 to indicate completion of the memory cycle.

CPUHLDA—CPU bus hold acknowledge signal indicating that microprocessor 101 relinquished system bus 110 to another master.

CPUHRQ1—registered output of ATUHRQ from the ATU2.

CPURQ—CPUHRQ is the CPU hold request signal.

CPURDY—the microprocessor ready signal indicating the end of the present cycle.

CWn—external cache memory 102 write enable signals.

DADS—one clock delay of LADS (if no CPURDY is detected) used to generate a write pulse during nonzero wait state cache write cycles.

DATACAC—data cache signal, a static signal indicating that only data is allowed to cache into external cache memory 102. DC, MIO and WR—the bus definition signals generated by microprocessor 101 to indicate the cycle type (i.e. memory read, IO write, etc.).

DIRn—current dirty bit signal

DIRTY—indicates that the currently accessed data from external cache memory 102 probably differs from the corresponding data currently held in main memory 103.

DMAADS—during DMA or ISA bus master cycle, AADS is needed to time external cache memory 102, if it is burst SRAM, DMAADS is used to regenerate both ADS and AADS.

DMACACHERD—DMA/CACHE read signal generated by cache controller 200 during a DMA cycle, which enables the buffer enable of external cache memory 102 if the present DMA cycle is a cache hit read and dirty bit set.

DMACS—control signal indicating that an internal cache write back cycle is ongoing, such that external bus master 104 needs to wait.

DMACYC—indicates the present cycle is a valid DMA cycle to be handled by VESA local bus.

DMARD—DMA read cycle.

DRAMRDY—DRAM ready signal generated by main memory 103 indicates to the current bus master that main memory 102 has completed its cycle.

DWORD—generated by the system indicates that cache controller 200 needs to compare all four bytes of the current data word.

EADS—the external address valid signal is generated by cache controller 200 to cause microprocessor 101 to perform an internal cache inquiry cycle.

ENDBW—end of burst write to the DRAM (main memory 103).

FAST—static control signal indicating that fast DRAM cycle is enabled (performance of DRAM control will be increased).

FASTEXT—cacheable memory range for external cache memory 102.

FASTINT—cacheable memory range for the CPU internal cache.

FASTM—the memory decoding signal indicates the memory is a valid cacheable cycle generated by main memory 103.

12CYC—the first two cycle signal which is active during DMA, bus master mode, CPU bus idle state, 1st and 2nd CPU cycle and inactive during CPU 3rd cycle to end of cycle.

1STCYC—the first cycle signal which is low during DMA, bus master mode, CPU bus idle state, 1st CPU cycle. During microprocessor 101 second cycle to end of cycle, it is high.

4DWMACH—the four double word match signal generated by cache controller 102 informs system 100 that the present cycle is burstable. 4DWMACH also indicates when the entire cache line is valid when ALL is active or that the particular word to be accessed is valid.

HITM—internal cache hit modified signal generated by microprocessor 101, which indicates to system 100 that data in the internal cache needs to be written-back.

INV—internal cache invalidate signal.

INVALID—a control signal for the cache write circuitry. During ISA Bus master or DMA cycle, external cache memory 102 needs to be updated if the present DMA cycle is a cache hit write.

IOR—AT bus I/O read signal for reading the internal registers.

IOW—AT bus I/O write signal for writing to the internal registers.

IOWAIT—indicates to system 100 to add wait states via IOCHRDY during DMA or ISA bus master cycles.

IWVn—input word valid signal is the data output by the external cache memory 102 indicates that word "n" in the cache line is valid.

KEN—internal cache enable signal.

LADS—one clock delay of the ADS signal and is used to define a write pulse to external cache memory 102 during a zero wait state cache write cycle.

LBCYC—local bus cycle signal from the VESA (local bus) slots indicating that the present CPU cycle is a VESA local bus cycle.

LCACHE—latched version of CACHE control signal.

LDIRn—next dirty bit signals.

LDIRTY—the last dirty signal generated by cache controller 200 indicates that the external write back cycle is about to finish.

LGNT—GNT signal from the VESA local bus (used in P5 mode only).

LOCAL—local is the output to indicate that the present cycle is a local bus (VESA) cycle.

LRDY—LRDY is the input from the VESA local bus.

MASTER—external bus master current signal indicates that an external bus master on the I/O expansion slot is master.

MEMACC—generated by cache controller 102 indicates the present cycle is a valid cachable cycle.

MEMR—I/O expansion slot memory read signal.

MEMSLOT—memory activity is I/O expansion slot signal, which is the logical and of MEMR and MEMW (the memory read and memory write signals from the I/O expansion slot).

MEMW—I/O expansion slot memory write signal.

MWRMRD—this is a latched version of MEMR and MEMW signal.

NOBUF—this is to control the output buffer of PA[2..31] such that during a DMA cycle when PA[2..31] are output they are floated to allow microprocessor 101 to perform an internal cache write back.

NOCAS1—disables the generation of CAS during CPU internal cache snooping.

NOCAS—output to the DRAM controller (main memory 103) to disable the output of CAS. NOCAS1 is a subset of NOCAS.

NODRAM—the no DRAM signal inhibits main memory 103 from activating, such that a command may be serviced by external cache memory 102.

NOHRQ2—this is to disable the generation of CPUHRQ. This is active when microprocessor 101 is doing an internal cache write back cycle.

OCPUADS—this is the ADS generated during BOFF and DMA cycles.

OWVn—output word valid signal is generated by cache controller 200 indicating whether word "n" in the accessed cache line is valid.

PA2—least significant address bit utilized to indicate which data word in the accessed cache line is requested.

PA3—second least significant address bit utilized to indicate which data word in the accessed cache line is requested.

PA26 & PA27—CPU address line A26 and A27.

PA31—generated by the system to indicate whether a math coprocessor is present.

PAOE1—CPU address bus output enable control for PA2 to PA23. This is active during DMA or ISA bus master cycle and P5 VESA local bus master cycles.

PAOE2—CPU address bus output enable control for PA24 to PA31. This is active only during DMA or ISA bus master cycle.

P24T—a static control signal to enable the CPU internal cache write back.

P4BLAST—BLAST signal from the 486 or P24T type CPU.

P5—P5 is to select the chip set is in P5 mode.

P5LBM—local bus in P5 mode only is in local bus master mode.

P5CAC—static signal indicating that a P5 read from external cache memory 102 does not need to have 4QWord all match before reading.

P5DMD—a static control signal indicating that support for the P5 controller is sitting on the DRAM MD bus.

R1ADS & R2ADS—intermediate ADS signals utilized to generate OCPUADS.

RAMCS—DRAM memory select. This is a memory decoding signal.

RDYIN—BRDYIN is the input from the BRDY inputs.

RDYRTN—RDYRTN is generated when a memory or IO command is negated. This is used for compatibility with VL during DMA mode.

READY0—zero wait state cycle signal which indicates to the system ready logic that the present cycle is a zero wait state cycle.

READY1—one wait state cycle signal which indicates to the system ready logic that the present cycle is a one wait state cycle, which occurs when cache controller 200 needs to update a tag and/or the status of cache memory 102.

REF—this is a combination of DRAM transparent refresh and the DMA refresh.

REFRESH—memory refresh signal generated by the system to inform cache controller 200 that system 100 is performing a refresh cycle.

RSTCYC—during power-on, reset or hard reset, RSTCYC is active until the detection of first ADS from the CPU. This is to prevent abnormal behavior of the DRAM controller.

Sn—(S1 and S2) intermediate state variables for the DRAM controller.

SLRDY—a static control signal selecting whether LRDY from the VL bus is synchronized or not.

SPD0, SPD1, SPD2—static control signals indicating the speed of system 100.

START—start is to initiate an active DRAM cycle.

Tn—(T0, T1, T2, T3) these are the counter digital or logic to control the CPU internal cache write back during DMA mode.

TAGMACH—tag match signal generated by the comparator with cache controller 200 indicating a cache hit.

TAGWR—the tag write signal generated by cache controller 200 causes external cache memory 102 to write the current status information (dirty and validity bits) into the current cache line.

TAGWRREQ—tag write request signal indicates that the tag and/or status information contained in cache memory 102 need to be updated through the assertion of TAGWR.

TEMP0 TEMP1—these are used to control the generation of DAMADS. EADS signals.

WADV—control signal controlling the next address of the burst SRAM (ADV input to Burst SRAM).

WBACK—WBACK is to indicate the present cycle is a DRAM write back cycle.

WBCYC—this is to indicate microprocessor 101 is doing an internal cache write back during DMA or ISA bus master cycle.

WBEN—the write back enabled signal indicates is generated by cache controller 200 to the remaining logic in cache controller 102 that the cache write back mode is enabled.

WBMA—this signal is to control the MA0 and MA1 address of the DRAM controller. The MA0 & MA1 is pipelined to increase the setup time of the DRAM.

WBSEL—write back select signal, a static signal allowing selection between a write through and a write back external cache memory protocol.

XAOE1—to control the buffer of the XA[2..7]bus.

XAOE2—to control the buffer of the XA[8..23]bus.

In a preferred embodiment the above signals are utilized by cache controller 200, which may be implemented in multiple PALs. The following PAL equations, written for an AMD PALASM 90 Version 1.1 compiler, generate one preferred embodiment of cache controller 200.

PAL 1

INPUTS : CLK PA2 PA3 MIO WR /LCACHE /IWV0 /IWV1 /IWV2 /IWV3 /TAGMACH /TAGWRREQ /BOFFREQ /CACHEMISS /BOFF /LADS /BLADS /ALL /1STCYC /ADRAMRDY LDIRTY P5CAC /P5

OUTPUTS : /4DWMACH /OWV0 /OWV1 /OWV2 /OWV3

EQUATIONS

MALL   = ALL * LCACHE

+ ALL * /P5CAC

P5CMISS = CACHEMISS * P5CAC

4DWMACH =   MALL * IWV0 * IWV1 * IWV2 * IWV3 * /CACHEMISS
    + /MALL * /PA2 * /PA3 * IWV0 * /P5CMISS
    + /MALL *  PA2 * /PA3 * IWV1 * /P5CMISS
    + /MALL * /PA2 *  PA3 * IWV2 * /P5CMISS
    + /MALL *  PA2 *  PA3 * IWV3 * /P5CMISS

OWV0 := /OWV0 * ADRAMRDY * /TAGWRREQ * ALL * (/PA2 * /PA3 + LCACHE * P5)
    + /OWV0 * ADRAMRDY * /TAGWRREQ * ALL * TAGMACH * IWV0
    + /OWV0 * LADS * TAGWRREQ * /BOFFREQ * /PA2 * /PA3
    + /OWV0 * LADS * TAGWRREQ *  BOFFREQ * IWV0
    + /OWV0 * LADS * TAGWRREQ * /BOFFREQ * TAGMACH * PA2 * IWV0
    + /OWV0 * LADS * TAGWRREQ * /BOFFREQ * TAGMACH * PA3 * IWV0
    + /OWV0 * BLADS * TAGMACH
    + /OWV0 * BLADS * /TAGMACH * /LDIRTY
    +  OWV0 * /1STCYC
    +  OWV0 * BOFF

OWV1 := /OWV1 * ADRAMRDY * /TAGWRREQ * ALL * (PA2 * /PA3 + LCACHE * P5)
    + /OWV1 * ADRAMRDY * /TAGWRREQ * ALL * TAGMACH * IWV1
    + /OWV1 * LADS * TAGWRREQ * /BOFFREQ * PA2 * /PA3
    + /OWV1 * LADS * TAGWRREQ *  BOFFREQ * IWV1
    + /OWV1 * LADS * TAGWRREQ * /BOFFREQ * TAGMACH * /PA2 * IWV1
    + /OWV1 * LADS * TAGWRREQ * /BOFFREQ * TAGMACH * PA3 * IWV1
    + /OWV1 * BLADS * TAGMACH
    + /OWV1 * BLADS * /TAGMACH * /LDIRTY
    +  OWV1 * /1STCYC
    +  OWV1 * BOFF

OWV2: = /OWV2 * ADRAMRDY * /TAGWRREQ * ALL * (/PA2 * PA3 + LCACHE * P5)
    + /OWV2 * ADRAMRDY * /TAGWRREQ * ALL * TAGMACH * IWV2
    + /OWV2 * LADS * TAGWRREQ * /BOFFREQ * /PA2 * PA3
    + /OWV2 * LADS * TAGWRREQ *  BOFFREQ * IWV2
    + /OWV2 * LADS * TAGWRREQ * /BOFFREQ * TAGMACH * PA2 * IWV2
    + /OWV2 * LADS * TAGWRREQ * /BOFFREQ * TAGMACH * /PA3 * IWV2
    + /OWV2 * BLADS * TAGMACH
    + /OWV2 * BLADS * /TAGMACH * /LDIRTY
    +  OWV2 * /1STCYC
    +  OWV2 * BOFF

OWV3 := /OWV3 * ADRAMRDY * /TAGWRREQ * ALL * (PA2 * PA3 + LCACHE * P5)
    + /OWV3 * ADRAMRDY * /TAGWRREQ * ALL * TAGMACH * IWV3
    + /OWV3 * LADS * TAGWRREQ * /BOFFREQ * PA2 * PA3
    + /OWV3 * LADS * TAGWRREQ *  BOFFREQ * IWV3
    + /OWV3 * LADS * TAGWRREQ * /BOFFREQ * TAGMACH * /PA2 * IWV3
    + /OWV3 * LADS * TAGWRREQ * /BOFFREQ * TAGMACH * /PA3 * IWV3
    + /OWV3 * BLADS * TAGMACH
    + /OWV3 * BLADS * /TAGMACH * /LDIRTY
    +  OWV3 * /1STCYC

+ OWV3 * BOFF

PAL 2

INPUTS : /BE0 /BE1 /BE2 /BE3 /BE4 /BE5 /BE6 /BE7 WR /DRAMRDY /TAGMACH
/4DWMACH /MEMACC DIRTY LDIRTY /LADS /BLADS /BRADS /REF /FASTEXT
/INVALID /LCACHE /BWRDY /WBEN P24T

OUTPUTS : /CW0 /CW1 /CW2 /CW3 /CW4 /CW5 /CW6 /CW7

STRING T1 'MEMACC * FAST * WR'

STRING T2 'MEM_ACC * FASTEXT * /WR * DRAMRDY * /REF'

EQUATIONS

CW0 = T1 * LADS * BE0 * TAGMACH * 4DWMACH * DIRTY * WBEN
    + T1 * WE1WS* BE0 * /P24T
    + T1 * WE1WS * BE0 * P24T * LCACHE
    + T1 * BLADS * /BRADS * TAGMACH
    + T1 * BLADS * /BRADS * /TAGMACH * /LDIRTY
    + T1 * BLADS * BRADS
    + T2
    + INVALID * TAGMACH * 4DWMACH * BE0

CW1 = T1 * LADS * BE1 * TAGMACH * 4DWMACH * DIRTY * WBEN
    + T1 * WE1WS* BE1 * /P24T
    + T1 * WE1WS * BE1 * P24T * LCACHE
    + T1 * BLADS * /BRADS * TAGMACH
    + T1 * BLADS * /BRADS * /TAGMACH * /LDIRTY
    + T1 * BLADS * BRADS
    + T2
    + INVALID * TAGMACH * 4DWMACH * BE1

CW2 = T1 * LADS * BE2 * TAGMACH * 4DWMACH * DIRTY * WBEN
    + T1 * WE1WS* BE2 * /P24T
    + T1 * WE1WS * BE2 * P24T * LCACHE
    + T1 * BLADS * /BRADS * TAGMACH
    + T1 * BLADS * /BRADS * /TAGMACH * /LDIRTY
    + T1 * BLADS * BRADS
    + T2
    + INVALID * TAGMACH * 4DWMACH * BE2

CW3 = T1 * LADS * BE3 * TAGMACH * 4DWMACH * DIRTY * WBEN
    + T1 * WE1WS* BE3 * /P24T
    + T1 * WE1WS * BE3 * P24T * LCACHE
    + T1 * BLADS * /BRADS * TAGMACH
    + T1 * BLADS * /BRADS * /TAGMACH * /LDIRTY
    + T1 * BLADS * BRADS
    + T2
    + INVALID * TAGMACH * 4DWMACH * BE3

CW4 = T1 * LADS * BE4 * TAGMACH * 4DWMACH * DIRTY * WBEN
    + T1 * WE1WS* BE4 * /P24T
    + T1 * WE1WS * BE4 * P24T * LCACHE
    + T1 * BLADS * /BRADS * TAGMACH
    + T1 * BLADS * /BRADS * /TAGMACH * /LDIRTY
    + T1 * BLADS * BRADS
    + T2
    + INVALID * TAGMACH * 4DWMACH * BE4

CW5 = T1 * LADS * BE5 * TAGMACH * 4DWMACH * DIRTY * WBEN
    + T1 * WE1WS* BE5 * /P24T
    + T1 * WE1WS * BE5 * P24T * LCACHE
    + T1 * BLADS * /BRADS * TAGMACH

```
        + T1 * BLADS * /BRADS * /TAGMACH * /LDIRTY
        + T1 * BLADS * BRADS
        + T2
        + INVALID * TAGMACH * 4DWMACH * BE5

CW6 = T1 * LADS * BE6 * TAGMACH * 4DWMACH * DIRTY * WBEN
        + T1 * WE1WS* BE6 * /P24T
        + T1 * WE1WS * BE6 * P24T * LCACHE
        + T1 * BLADS * /BRADS * TAGMACH
        + T1 * BLADS * /BRADS * /TAGMACH * /LDIRTY
        + T1 * BLADS * BRADS
        + T2
        + INVALID * TAGMACH * 4DWMACH * BE6

CW7 = T1 * LADS * BE7 * TAGMACH * 4DWMACH * DIRTY * WBEN
        + T1 * WE1WS* BE7 * /P24T
        + T1 * WE1WS * BE7 * P24T * LCACHE
        + T1 * BLADS * /BRADS * TAGMACH
        + T1 * BLADS * /BRADS * /TAGMACH * /LDIRTY
        + T1 * BLADS * BRADS
        + T2
        + INVALID * TAGMACH * 4DWMACH * BE7

DWORD = BE0 * BE1 * BE2 * BE3 * /P5
        + BE0 * BE1 * BE2 * BE3 * BE4 * BE5 * BE6 * BE7 * P5
```

PAL 3

INPUTS: CLK PA26 PA27 PA31 MIO WR /DADS /12CYC /1STCYC /TAGMACH /4DWMACH
/NODRAM /FASTEXT /BOFFBUREN /DMACACHERD /BHLDA /MEMSLOT /WBMA /DMARD
/REFRESH /LOCAL /LGNT /LRDY /LBCYC CACBIT /CMDDLY P24T /P5DMD /P5

OUTPUTS: /CACRDYEN /CACHEOE /CACHMISS /BUFFEN /ALL

```
MACRO       P5SW    'P5DMD * P5'
            CPUCYC  '/LGNT + LGNT * LRDY + LGNT * BOFFBUFEN'

EQUATIONS

CACHMISS = /CACHMISS * /BHLDA * /1STCYC * /WR * MIO * FASTEXT * /TAGMACH * DADS
        + /CACHMISS * /BHLDA * /1STCYC * /WR * MIO * FASTEXT * TAGMACH *
        /4DWMACH * DADS
        + CACHMISS * /1STCYC

CACHEOE = /BHLDA * /BOFFBUFEN * 12CYC * CACBIT * MIO * /WR * /PA31 * /PA27 *
          /PA26 * /MLOCAL * /LBCYC

+ /BHLDA * /BOFFBUFEN * /1STCYC * CACBIT * MIO * /WR * /PA31 * /PA27 *
          /PA26 * /LOCAL * TAGMACH * 4DWMACH * FASTEXT

+ /BHLDA * BOFFBUFEN * CACBIT
        + BHLDA * DMACACHERD * /REFRESH * CACBIT * /P24T
        + BHLDA * DMACACHERD * /REFRESH * CACBIT * P24T * DMARD

CACRDYEN = /BHLDA * /BOFFBUFEN * 12CYC * CACBIT * MIO * /WR * /PA31 *
           /PA27 * /PA26

+ /BHLDA * /BOFFBUFEN * /1STCYC * CACBIT * MIO * /WR * /PA31 *
          /PA27 * /PA26 * /LOCAL * TAGMACH * 4DWMACH * FASTEXT

BUFFEN = /P5SW * /BHLDA * MIO * WR * /1STCYC
        + /P5SW * /BHLDA * /NODRAM * MIO * /WR * 12CYC
        + /P5SW * BHLDA * /NODRAM * (MEMR + MEMW) * /REFRESH
        + /P5SW * BHLDA * WBMA
        + P5SW * /BHLDA * CPUCYC * MIO * WR * /1STCYC
        + P5SW * /BHLDA * CPUCYC * MIO * /WR * /12CYC * /NODRAM
```

```
    + P5SW * /BHLDA * CPUCYC * /MIO * /12CYC
    + P5SW * /BHLDA * /CPUCYC * 12CYC
    + P5SW * /BHLDA * /CPUCYC * /1STCYC * WR
    + P5SW * /BHLDA * /CPUCYC * /1STCYC * /WR * NODRAM
    + P5SW * BHLDA * MEMW
    + P5SW * BHLDA * DMACACHERD * /REFRESH * /P24T
    + P5SW * BHLDA * DMACACHERD * /REFRESH * P24T * DMARD
    + P5SW * BHLDA * WBMA

ALL     = /BHLDA * MIO * /WR

MLOCAL  = /1STCYC * 12CYC * LOCAL * /CMDDLY * /CLK
          + LOCAL * CMDDLY
```

PAL 4

INPUTS: CLK /BLAST /CPURDY /LADS /LDIRTY /TAGWRREQ /BOFFREQ /LCACHE /FASTEXT
/TAGMACH /ADRAMRDY /4DWMACH /ABOFF /PTERM1 /C1 /C2 BHLDA /BWA1 /BWA0
/ADWRDY WBSEL BOFFDLY /ABOFF P24T /P5

OUTPUTS: /WBEN /BOFFADS /READY1 /BOFFBUFEN /BOFF /BOFF1 /CPUBOFF /TAGWR

EQUATIONS

STRING CACHEMEM 'FASTEXT'

```
WB_EN := WBSEL * /BOFF * CPURDY
       + WBEN  * /BOFF * /CPURDY
       + WBEN  * BOFF

BOFFADS := /BOFFADS * /BOFFBUFEN * BOFF * READY1 * /BOFFDLY
         + /BOFFADS * BOFFBUFEN * BOFF * CPURDY * /LDIRTY * /BOFFDLY
         + /BOFFADS * ALTADS * BOFFDLY

ALTADS := /ALTADS * /BOFFBUFEN * BOFF * READY1
        + /ALTADS * BOFFBUFEN * BOFF * CPURDY * /LDIRTY

READY1 := /READY1 * LADS * BOFFREQ * /BOFFDLY
        + /READY1 * /BOFF * WBEN * LADS * TAGWRREQ * /BOFFREQ * /CPURDY * /P24T
        + /READY1 * /BOFF * WBEN * LADS * TAGWRREQ * BOFFREQ * CPURDY * P24T
          * /LCACHE
        + /READY1 * BOFF * /BOFFBUFEN * BOFFDLY

BOFFBUFEN := /BOFFBUFEN * WBSEL * WBEN * BOFF * READY1
           + BOFFBUFEN * WBSEL * WBEN * /TAGWR

BOFF := /BOFF * WBSEL * WBEN * LADS * BOFFREQ
      + BOFF * WBSEL * WBEN * /TAGWR

BOFF1 := ABOFF

CPUBOFF = BOFF + BOFF1

TAGWR := /TAGWR * PTERM1 * BLAST * ADRAMRDY * /TAGMACH
       + /TAGWR * PTERM1 * BLAST * ADRAMRDY * TAGMACH * /4DWMACH
       + /TAGWR * WBEN * TAGWRREQ * LADS * /CPURDY * /BOFFREQ * /P24T
       + /TAGWR * WBEN * TAGWRREQ * LADS * /CPURDY * /BOFFREQ * P24T * /LCACHE
       + /TAGWR * BOFFBUFEN * BOFF * CPURDY * LDIRTY
       + /TAGWR * BHLDA * CACHEMEM * TAGMACH * BWA1 * BWA0 * /5066MHZ
       + /TAGWR * BHLDA * CACHEMEM * TAGMACH * BWA1 * BWA0 * ABWRDY
         * /5066MHZ
       + /TAGWR * C1 * C2
```

PAL 5

INPUTS: MIO DC WR /DWORD /FASTEXT /FASTM /TAGMACH /4DWMACH DIRTY /BOFFBUFEN
/BHLDA /MEMR LDIRTY CACBIT /WBEN /LMEMR DATACAC

OUTPUTS: /MEMACC /DMACACHERD /READY0 /NODRAM /PTERM1 /BOFFREQ /TAGWRREQ

STRING CACHEMEM 'FASTEXT * MIO'

EQUATIONS

MEMACC = /BHLDA * MIO * /DATACAC
+ /BHLDA * MIO * DC * DATACAC

DMACACHERD = BHLDA * MEMR * FASTM * TAGMACH * 4DWMACH * DIRTY

READY0    = /BOFFBUFEN * /BHLDA * WBEN * MIO * WR

PTERM1 = /BHLDA * /WR * CACHEMEM * /DATACAC
+ /BHLDA * /WR * CACHEMEM * DC * DATACAC

TAGWRREQ = /BOFFBUFEN * /BHLDA * CACHEMEM * WR * WBEN * DWORD
+ /BOFFBUFEN * /BHLDA * CACHEMEM * WR * WBEN * /DWORD
* TAGMACH * 4DWMACH
+ /BOFFBUFEN * /BHLDA * CACHEMEM * WR * /WBEN * TAGMACH * 4DWMACH
+ /BOFFBUFEN * /BHLDA * CACHEMEM * /WR * /TAGMACH * DIRTY
+ /BOFFBUFEN * /BHLDA * CACHEMEM * /WR * TAGMACH * /4DWMACH * DIRTY

NO_DRAM = /BOFFBUFEN * /BHLDA * CACHEMEM * WR * WBEN * DWORD
+ /BOFFBUFEN * /BHLDA * CACHEMEM * WR * WBEN * /DWORD
* TAGMACH * 4DWMACH
+ /BOFFBUFEN * /BHLDA * CACHEMEM * /WR * /TAGMACH * DIRTY
+ /BOFFBUFEN * /BHLDA * CACHEMEM * /WR * TAGMACH * /4DWMACH * DIRTY
+ /BOFFBUFEN * /BHLDA * CACHEMEM * /WR * TAGMACH * 4DWMACH * CACBIT
+ BHLDA * (MEMR + LMEMR) * FASTM * TAGMACH * 4DWMACH * DIRTY

BOFFREQ = /BOFFBUFEN * /BHLDA * CACHEMEM * WR * WBEN * /TAGMACH
* LDIRTY * DWORD
+ /BOFFBUFEN * /BHLDA * CACHEMEM * /WR * /TAGMACH * DIRTY
+ /BOFFBUFEN * /BHLDA * CACHEMEM * /WR * TAGMACH * /4DWMACH * DIRTY

<u>PAL 6</u>

INPUTS: PA2 PA3 CPUCLK /BOFFBUFEN /CPURDY /LADS /TAGWRREQ DIR0 DIR1 DIR2 DIR3
/BOFFREQ /TAGMACH /TAGWR /ALL /BLADS /1STCYC

OUTPUTS: PA2 PA3 /LDIR0 /LDIR1 /LDIR2 /LDIR3 /DIRTY /LDIRTY

EQUATIONS

PA3 = LDIR2 * /LDIR1 * /LDIR0
+ LDIR3 * /LDIR2 * /LDIR1 * /LDIR0

PA3.TRST = BOFFBUFEN

PA2 = LDIR1 * /LDIR0
+ LDIR3 * /LDIR2 * /LDIR1 * /LDIR0

PA2.TRST = BOFFBUFEN

LDIR3 := /LDIR3 * PA2 * PA3 * LADS * TAGWRREQ * /BOFFREQ * /CPURDY

+ /LDIR3 * /DIR3 * LADS * BOFFREQ * /CPURDY
+ /LDIR3 * /DIR3 * /PA2 * LADS * TAGWRREQ * /BOFFREQ * /CPURDY
+ /LDIR3 * /DIR3 * /PA3 * LADS * TAGWRREQ * /BOFFREQ * /CPURDY
+ /LDIR3 * BLADS * TAGMACH
+ /LDIR3 * BLADS * /TAGMACH * LDIRTY
+ LDIR3 * BOFFBUFEN * /CPURDY
+ LDIR3 * BOFFBUFEN * CPURDY * /PA2
+ LDIR3 * BOFFBUFEN * CPURDY * /PA3
+ LDIR3 * /BOFFBUFEN * /1STCYC

LDIR3.TRST = TAGWR

LDIR2 := /LDIR2 * /PA2 * PA3 * LADS * TAGWRREQ * /BOFFREQ * /CPURDY
    + /LDIR2 * /DIR2 * LADS * BOFFREQ * /CPURDY
    + /LDIR2 * /DIR2 * PA2 * LADS * TAGWRREQ * /BOFFREQ * /CPURDY
    + /LDIR2 * /DIR2 */PA3 * LADS * TAGWRREQ * /BOFFREQ * /CPURDY
    + /LDIR2 *  BLADS * TAGMACH
    + /LDIR2 *  BLADS * /TAGMACH * LDIRTY
    +  LDIR2 *  BOFFBUFEN * /CPURDY
    +  LDIR2 *  BOFFBUFEN * CPURDY * PA2
    +  LDIR2 *  BOFFBUFEN * CPURDY * /PA3
    +  LDIR2 * /BOFFBUFEN * /1STCYC

LDIR2.TRST = TAGWR

LDIR1 := /LDIR1 * PA2 * /PA3 * LADS * TAGWRREQ * /BOFFREQ * /CPURDY
    + /LDIR1 * /DIR1 * LADS * BOFFREQ * /CPURDY
    + /LDIR1 * /DIR1 * /PA2 * LADS * TAGWRREQ * /BOFFREQ * /CPURDY
    + /LDIR1 * /DIR1 *  PA3 * LADS * TAGWRREQ * /BOFFREQ * /CPURDY
    + /LDIR1 *  BLADS * TAGMACH
    + /LDIR1 *  BLADS * /TAGMACH * LDIRTY
    +  LDIR1 *  BOFFBUFEN * /CPURDY
    +  LDIR1 *  BOFFBUFEN * CPURDY * /PA2
    +  LDIR1 *  BOFFBUFEN * CPURDY * PA3
    +  LDIR1 * /BOFFBUFEN * /1STCYC

LDIR1.TRST = TAGWR

LDIR0 := /LDIR0 * /PA2 * /PA3 * LADS * TAGWRREQ * /BOFFREQ * /CPURDY
    + /LDIR0 * /DIR0 * LADS * BOFFREQ * /CPURDY
    + /LDIR0 * /DIR0 * PA2 * LADS * TAGWRREQ * /BOFFREQ * /CPURDY
    + /LDIR0 * /DIR0 * PA3 * LADS * TAGWRREQ * /BOFFREQ * /CPURDY
    + /LDIR0 *  BLADS * TAGMACH
    + /LDIR0 *  BLADS * /TAGMACH * LDIRTY
    +  LDIR0 *  BOFFBUFEN * /CPURDY
    +  LDIR0 *  BOFFBUFEN * CPURDY * PA2
    +  LDIR0 *  BOFFBUFEN * CPURDY * PA3
    +  LDIR0 * /BOFFBUFEN * /1STCYC

LDIR0.TRST = TAGWR

LDIRTY = BOFFBUFEN * LDIR3 * /LDIR2 * /LDIR1 * /LDIR0
    + BOFFBUFEN */LDIR3 *  LDIR2 * /LDIR1 * /LDIR0
    + BOFFBUFEN */LDIR3 * /LDIR2 *  LDIR1 * /LDIR0
    + BOFFBUFEN */LDIR3 * /LDIR2 * /LDIR1
    +/BOFFBUFEN * DIR0 * DIR1 * DIR2 * DIR3

DIRTY =  ALL * DIR0 * DIR1 * DIR2 * DIR3
    + /ALL * /PA3 * /PA2 * DIR0
    + /ALL * /PA3 *  PA2 * DIR1
    + /ALL *  PA3 * /PA2 * DIR2
    + /ALL *  PA3 *  PA2 * DIR3
    + /WBEN

PAL 7

INPUTS: CLK /ADS MIO WR /HITM /LCACHE BHLDA /FASTEXT /TAGMACH LDIRTY /BOFF
    /WBEN /BSRAM P24T

OUTPUTS: /BLADS /BRADS /WADV /C1 /C2

EQUATIONS

BLADS := /BLADS * /BHLDA * /BOFF * ADS * MIO * WR * LCACHE * P24T * WBEN
    + BLADS * /BRADS * FASTEXT * TAGMACH * BSRAM
    + BLADS * /BRADS * FASTEXT * /TAGMACH * /LDIRTY * BSRAM
    + BLADS * C1 * BSRAM
    + /BLADS * BRADS * /BSRAM

```
BRADS := /BRADS * BLADS * FASTEXT * TAGMACH
       + /BRADS * BLADS * FASTEXT * /TAGMACH * /LDIRTY
       + BRADS * C1 * BSRAM
       + BRADS * /C2

C1 := /C1 * /C2 * BLADS * FASTEXT * TAGMACH * BSRAM
    + /C1 * /C2 * BLADS * FASTEXT * /TAGMACH * /LDIRTY * BSRAM
    + C1 * /C2 * BRADS
    + /C1 * /C2 * BLADS * BRADS * /BSRAM

C2 := /C2 * BLADS * C1
    + C2 * BRADS * C1

WADV := /WADV * BLADS * /BRADS * FASTEXT * TAGMACH * /BSRAM
      + /WADV * BLADS * /BRADS * FASTEXT * /TAGMACH * /LDIRTY * /BSRAM
      + /WADV * BRADS * /BSRAM
```

PAL 8

```
INPUTS: CLK /HITM /EADS /FASTM /ABHLDA /MEMR /MEMW /DMACYC /RDYIN /LRDY /LOCAL
        /ENDBW CPUHLDA /LGNT /REFRESH RSTCYC NOHRQ2 /SPD0 /SPD1 /SLRDY P5LBM
        P24T /P5

OUTPUTS: /CHRDY /NOCAS1 /NOCAS /NOBUF /DMARD /RDYRTN /T0 /T1 /T2 /T3 INV /BHLDA
         /DMACS CPUHRQ1 CPURQ /PAGE1 /PAGE2 /XAOE1 /XAOE2
```

EQUATIONS

```
CHRDY := /CHRDY * /T0 * T1 * /HITM
       + /CHRDY * DMACYC * LOCAL * LRDY * /P5
       + CHRDY * DMACYC

NOCAS1 := /NOCAS1 * EADS * P24T
        + NOCAS1 * T0 * /T1
        + NOCAS1 * HITM

DMARD := /DMARD * /HITM * MEMR * T0 * T1
       + /DMARD * DMACYC

NOHRQ1 := /NOHRQ1 * /WBCYC * HITM * T0 * T1
        + NOHRQ1 * /WBCYC * HITM

CPUHRQ1 := ATUHRQ

CPUHRQ := CPUHRQ1 * /RSTCYC * /P24T
        + CPUHRQ1 * /RSTCYC * /NOHRQ1 * /NOHRQ2 * P24T

BHLDA := ABHLDA

DMACS := /DMACS * NOHRQ1
       + DMACS * HITM
       + DMACS * T0 * T1

NOBUF := /NOBUF * NOHRQ1
       + NOBUF * HITM
       + NOBUF * /CPUHLDA

DCYC := DMACYC

RDYRTN := /RDYRTN * /DMACYC * DCYC
        + /RDYRTN * /BHLDA * LRDY * SPD1 * SPD0 * /P5
        + /RDYRTN * BHLDA * LRDY * SLRDY * /P5

T0 := /T0 * EADS * P24T
    + /T0 * BHLDA * ENDBW
    + T0 * /T1
```

```
T1  := /T1 * T0 * T2 * T3 * /SPD1
     + /T1 * T0 * T2 * T3 * /SPD0
     + /T1 * T0 * /T2 * T3 * SPD1 * SPD0
     + T1 * T0

T2  := /T2 * /T3 * T0 * /T1
     + T2 * /T3

T3  := /T3 * T0 * /T1 * CPUHLDA * /SPD0
     + /T3 * T0 * /T1 * CPUHLDA * /SPD1
     + /T3 * T0 * T2 * CPUHLDA * SPD1 * SPD0
     + T3 * T2

NOCAS = RSTCYC
      + NOCAS1
      + EADS * P24T
      + DMACYC * /TEMP0 * FASTM * P24T

PAGE1 = BHLDA * /NOBUF
      + BOFFBUFEN
      + /BHLDA * /BOFFBUFEN * LGNT * /LRDY * P5 * P5LBM

PAGE2 = BHLDA * /NOBUF
      + BOFFBUFEN

XAOE1 = /BHLDA * /REFRESH * (/LGNT + /P5)
      + /BHLDAA * /LGNT * P5

XAOE2 = /BHLDA * (/LGNT * /P5)

PAL 9

INPUTS: CLK /CPUADS MIOIN DCIN WRIN /BE[0..7]IN /CACHE /HITM /P4BLAST /CPUBRDY
        CPUHLDA /FASTINT /LADS /1STCYC /BOFF /BOFFBUFEN /BOFFADS /BOFFREQ
        /BHLDA /DMAADS NOHRQ2 /CMDDLY P24T /P5

OUTPUTS: /ADS /AADS /R1ADS /R2ADS /OCPUADS /B0 /B1 /B2 /BLAST /P4CACHE /LCACHE
         /NOHRQ2 MIO WR DC /BLAST /BE[0..7]

EQUATIONS

R1ADS := /BHLDA * /BOFF * CPUADS * CMDDLY
       + BHLDA * /CPUHLDA * HITM * CPUADS * CMDDLY

R2ADS := BHLDA * DMAADS * CMDDLY
       + BOFFBUFEN * BOFFADS * CMDDLY

AADS := /BHLDA * /BOFF * CPUADS
      + BHLDA * /CPUHLDA * HITM * CPUADS
      + BHLDA * DMAADS
      + BOFFBUFEN * BOFFADS

B0 := /B0 * LADS * MIOIN * CACHE * FASTINT * /BOFFREQ * P5
    + B0 * /1STCYC * /B1

B1 := /B1 * LADS * MIOIN * CACHE * FASTINT * CPUBRDY * P5
    + /B1 * /1STCYC * B0 * CPUBRDY
    + B1 * /1STCYC * /B2

B2 := /B2 * /1STCYC * B1 * CPUBRDY
    + B2 * /1STCYC * /CPUBRDY

P5BLAST := /P5BLAST * /BHLDA * /BOFF * ADS * MIOIN * /CACHE * P5
         + /P5BLAST * /BHLDA * /BOFF * ADS * /MIOIN * P5
         + /P5BLAST * LADS * CACHE * FASTINT * P5
         + /P5BLAST * B2 * CPUBRDY
         + P5BLAST * /1STCYC * /CPUBRDY
```

```
BLAST  = P4BLAST * /P5
       + P5BLAST * P5
       + BOFFBUFEN

P4CACHE := /P4CACHE * /BHLDA * /BOFF * ADS * MIOIN * WRIN * CACHE * P24T * /P5
         + P4CACHE * /CPURDY * /CPUBRDY
         + P4CACHE * /P4BLAST * /CPURDY * CPUBRDY
         + P4CACHE * BOFF
         + P4CACHE * H1

H1 := /H1 * /P4CACHE * /BHLDA * /BOFF * ADS * MIOIN * WRIN * CACHE * P24T * /P5
    + H1 * /BOFF * /ADS
    + H1 * BOFF
    + H1 * H2

H2 := /H2 * H1 * BOFF
    + H2 * /ADS
    + H2 * BOFF

NOHRQ2 := /NOHRQ2 * /BHLDA * /BOFF * CPUADS * MIOIN * WRIN * CACHE * P24T * /P5
        + NOHRQ2 * CPURDY * /CPUBRDY
        + NOHRQ2 * BOFF
        + NOHRQ2 * H1

LCACHE = P4CACHE * /BOFFBUFEN * /P5
       + CACHE * /BOFFBUFEN

OCPUADS = BOFFADS * /CMDDLY
        + DMAADS * /CMDDLY
        + R2ADS

ADS  = CPUADS * /CMDDLY
     + R1ADS
     + OCPUADS

MIO  = MIOIN
     + BOFFBUFEN

WR   = WRIN
     + BOFFBUFEN

DC   = DCIN
     + BOFFBUFEN

BE[0..3] = BE[0..3]IN
         + BOFFBUFEN

BE[4..7] = BE[4..7]IN * P5
         + BOFFBUFEN
```

PAL 10

INPUTS: CLK /ADS MIO WR /HITM CPUHLDA /LCACHE BHLDA /START RAMCS /ACAS
/BURST /S1 /S2 /DRAMRDY /NODRAM FAST /SPD0 /SPD1 /SPD2 P24T /P5

OUTPUTS: /BWDRAM /WBMA /BWA0 /BWA1 ENDBW /WBACK /BWCAS /ABWRDY /BWRDY
/WBCYC

EQUATIONS

```
BWDRAM := /BWDRAM * /BHLDA * START * MIO * WR * LCACHE * /NODRAM * RAMCS
            * P24T
        + BWDRAM * /BHLDA * /ENDBW

WBACK := /WBACK * /BHLDA * /ACAS * S1 * S2 * /BURST * DRAMRDY * BWDRAM
       + /WBACK * BHLDA * /CPUHLDA * HITM * ADS * MIO * WR * P24T * /S66MHZ
       + /WBACK * BHLDA * WBMA * S66MHZ
```

```
              + WBACK * /BHLDA * BWDRAM

WBMA  := /WBMA * /BHLDA * ACAS * /S1 * /S2 * /BURST * BWDRAM * S66MHZ
              + /WBMA * /BHLDA * /ACAS * S1 * S2 * /BURST * BWDRAM * DRAMRDY * /S66MHZ
              + WBMA * /BHLDA * BWDRAM
              + /WBMA * BHLDA * /CPUHLDA * HITM * ADS * MIO * WR * P24T
              + WBMA * BHLDA * /ENDBW

BWA0  := /BWA0 * /BHLDA * ACAS * /S1 * S2 * /BURST * BWDRAM * S66MHZ
              + /BWA0 * BHLDA * /ACAS * S1 * S2 * /BURST * BWDRAM * DRAMRDY * /S66MHZ
              + /BWA0 * WBMA * BWRDY * /S66MHZ
              + /BWA0 * WBMA * ABWRDY * S66MHZ
              + BWA0 * WBMA * /BWRDY * /S66MHZ
              + BWA0 * WBMA * /ABWRDY * S66MHZ

BWA1  := /BWA1 * WBMA * BWA0 * BWRDY * /S66MHZ
              + BWA1 * WBMA * /BWA0
              + BWA1 * WBMA * /BWRDY * /S66MHZ
              + /BWA1 * WBMA * BWA0 * ABWRDY * S66MHZ
              + BWA1 * WBMA * /ABWRDY * S66MHZ

ENDBW := /ENDBW * BWDRAM * BWA1 * /BWA0 * BWRDY * /5066MHZ
              + /ENDBW * BWDRAM * BWA1 * BWA0 * BWRDY * 5066MHZ
              + /ENDBW * BHLDA * BWA1 * BWA0 * /5066MHZ
              + /ENDBW * BHLDA * BWA1 * BWA0 * ABWRDY * 5066MHZ

BWCAS := /BWCAS * WBACK * /50F66MHZ
              + /BWCAS * WBACK * ABWRDY * 50F66MHZ
              + BWCAS * WBACK * /BWRDY

BWRDY := /BWRDY * WBACK * /50F66MHZ * /S66MHZ
              + /BWRDY * WBACK * BWCAS * S66MHZ
              + /BWRDY * WBACK * AWRDY * 50F66MHZ

ABWRDY := /ABWRDY * WBACK * /BWCAS

WBCYC := /WBCYC * BHLDA * /CPUHLDA * HITM * ADS * P24T
              + WBCYC * BHLDA * HITM

PAL 11

INPUTS: CLK PA31 MIO /BLAST /CPUBRDY /CPURDY /FASTINT /FASTM /LOCAL /1STCYC
            /BHLDA /MASTER /MEMR /MEMW /IOR /IOW REFRESH /CHRDY /MWRMRD /LBCYC
            /SPD0 /SPD1 /SPD2 /CMDDLY P24T

OUTPUTS: /TEMP0 /TEMP1 /KEN /INVALID /DMAADS /EADS INV /DMACYC /IOWAIT

EQUATIONS

KEN1633 = 1STCYC * /PA31
              + /1STCYC * FASTINT * MIO

KEN5066 := 1STCYC
              + FASTINT * MIO
                + /1STCYC * CPUBRDY * BLAST
                + /1STCYC * CPURDY
    KEN       = KEN1633 * /LBCYC * (/SPD1 * SPD0 + SPD2 * SPD0)
              + KEN5066 * /LBCYC * /MASK * SPD1 * SPD0

MASK      = /1STCYC * 12CYC * LOCAL * CMDDLY

DMACYC := BHLDA * MWRMRD * MEMR * /REFRESH
              + BHLDA * MWRMRD * MEMW
              + BHLDA * MASTER * IOR
              + BHLDA * MASTER * IOW
```

```
EADS   := /EADS * BHLDA * DMACYC * MEMW * /TEMP0 * /P24T
        + /EADS * BHLDA * DMACYC * MEMW * /TEMP0 * P24T * FASTM
        + /EADS * BHLDA * DMACYC * MEMR * /REFRESH * /TEMP0 * P24T * FASTM

TEMP0  := /TEMP0 * EADS
        + TEMP0 * BHLDA * MEMR * /REFRESH
        + TEMP0 * BHLDA * MEMW

TEMP1  := /TEMP1 * DMAADS
        + TEMP1 * BHLDA * MEMR * /REFRESH
        + TEMP1 * BHLDA * MEMW
        + TEMP1 * BHLDA * MASTER * IOR
        + TEMP1 * BHLDA * MASTER * IOW

INV    = EADS * MEMW * P24T

DMAADS := /DMAADS * DMACYC * /TEMP1

INVALID0 := /INVALID0 * /TEMP1 * DMAADS * MEMW * FASTM

INVALID  := /INVALID * /TEMP1 * DMAADS * MEMW * FASTM * /CMDDLY
         + /INVALID * INVALID0 * CMDDLY

IOWAIT = BHLDA * MEMR * /REFRESH * FASTM * /CHRDY * P24T
       + BHLDA * MEMW * FASTM * /CHRDY * P24T
       + BHLDA * MEMW * /REFRESH * LOCAL * /CHRDY
       + BHLDA * MEMW * LOCAL * /CHRDY
       + BHLDA * MASTER * IOR * LOCAL * /CHRDY
       + BHLDA * MASTER * IOW * LOCAL * /CHRDY
```

What is claimed is:

1. A cache controller apparatus for controlling an external write back cache memory and arbitrating a system bus, said system bus containing a data bus, an address bus and a control bus, which link together devices in a system including, a microprocessor unit containing an internal cache memory having a write back mode of operation, the microprocessor unit being connected directly to the system bus, an external cache memory connected directly on the data bus, said external cache memory storing a plurality of cache lines, each of said cache lines containing data, one or more validity bits and one or more dirty bits, said one or more validity and dirty bits indicating a status for said each of said cache lines, a main memory connected directly to the system bus, one or more external bus masters each capable of direct memory access and each being connected directly to the system bus, said cache controller apparatus comprising:

means for determining said status of one of said plurality of cache lines in said external cache memory selected An response to a memory access command, said determining means connected to said system bus and said external cache memory, said determining means serving to determine if said memory access command necessitates an external cache write-back cycle;

means for maintaining said status information for each of said plurality of cache lines, such that said determining means may determine current status of any of said plurality of cache lines;

means for servicing said memory access request when said external cache write-back cycle is not necessary, said servicing means connected to said external cache memory serving to control the reading and writing operations of said external cache memory;

means for directing said external cache write-back cycle by writing one or more of said plurality of cache lines from said external cache memory to said main memory, said write-back directing means serving to simulate said memory access command controlled by said microprocessor unit;

means for monitoring said system bus for said memory access commands issued by one of said one or more external bus masters, said monitoring means further causing said microprocessor unit to perform an internal cache inquiry; and means for temporarily transferring mastership of said system bus from said one of said one or more external bus masters to said microprocessor unit, such that said microprocessor unit can perform a microproccessor write-back cycle, said means for temporarily transferring mastership further including means for causing said one of said at least one external bus master to remain in a wait state until said microprocessor writes said data to said main memory.

2. A method for monitoring activity on a system bus to provide cache coherency for an internal write back cache memory in a system containing, said system bus including data bus, an address bus and a control bus, a microprocessor unit containing an internal cache memory having a write back mode of operation, the microprocessor unit being connected directly to the system bus, an external cache memory connected to the data bus, a main memory connected to the system bus, one or more external bus masters each capable of direct memory access and each of said one or more external bus masters being connected to the system bus, the method for monitoring activity on the system bus to provide cache coherency for an internal write back cache memory comprising the steps of:

(a) giving one of the one or more external bus masters mastership of the system bus;

(b) asserting a valid memory command on the system bus for reading or writing data at a desired memory location, the valid memory command being asserted by one of the one or more external bus masters;

(c) causing the microprocessor unit to perform an internal cache inquiry to determine if the internal cache memory contains modified data to be stored at the desired memory location;

(d) forcing the one of the one or more external bus masters to wait asserting a wait state signal such that the one of the one or more external bus masters execute unnecessary idle commands as if extra wait states are needed to complete the present command, the step of forcing being contemporaneous to the step of causing;

(e) notifying the system of a pending microprocessor write-back cycle upon the internal write back cache memory containing modified data to be stored at the desired memory location;

(f) providing the microprocessor unit with temporary mastership of the system bus upon the microprocessor unit containing modified data to be stored at the desired memory location, such that it can perform the pending microprocessor write-back cycle;

(g) invalidating a corresponding cache line in the external cache memory during the microprocessor write back upon the microprocessor unit writing back data contained in the external cache memory; and (h) allowing the one of the one or more external bus masters to continue with the valid memory commands.

3. The method according to claim 2 wherein the microprocessor unit is an INTEL OVERDRIVE PROCESSOR, the step of giving one of the one or more external bus masters mastership of the system bus, comprises the substeps of:

asserting a bus request signal upon the microprocessor unit generated by the one of the one or more external bus masters; and receiving a bus hold acknowledge signal from the microprocessor unit through the system bus, the bus hold acknowledge signal indicating to the one of the one or more external bus masters that it is master of the system bus.

4. The method according to claim 2 wherein the microprocessor unit is an INTEL OVERDRIVE PROCESSOR and a bus request signal has been generated by the one of the one or more external bus masters and acknowledged by the microprocessor unit, the step of providing the microprocessor unit with temporary mastership of the system bus for the pending microprocessor write,back cycle the substeps of:

deasserting a bus request signal; and reasserting the bus request signal once the microprocessor unit begins the pending microprocessor write-back cycle such that once the pending microprocessor write-back cycle is completed the one of the one or more external bus masters may regain mastership of the system bus.

5. A computer system comprising:

a system bus containing a data bus, an address bus and a control bus;

a microprocessor directly on said system bus, said microprocessor having an internal write-back cache;

at least one external bus master directly on said system bus, each of said at least one external bus master being capable of direct memory access;

a write-back cache memory directly on said address and data bus portions of said system bus, said write-back cache memory having a plurality of cache lines;

a main memory unit directly on said address and control bus portions of said system bus;

a bi-directional buffer between said data bus portion of said system bus and data lines of said main memory unit, said bi-directional buffer having a tri-state condition; and a cache controller directly on said system bus being further connected to said write-back cache memory and said bi-directional buffer, said cache controller including, means for updating status for a selected one or more of said plurality of cache lines, said selected one or more of said plurality of cache lines being selected by one of said microprocessor and said at least one external bus master as part of a memory access command, means for controlling a write-back operation of the external cache memory, where said status for said selected one or more of said plurality of cache lines and said memory access command require said write-back operation, said write-back operation controlling means transparently writing said selected one or more of said plurality of cache lines by simulating said memory access command issued by said microprocessor, means for controlling a write operation into said selected one or more of said plurality of cache lines where said status for said selected one or more of said plurality of cache lines and said memory access command require said write operation, means for controlling a read operation from said selected one or more of said plurality of cache lines where said status from said selected one or more of said plurality of cache lines and said memory access command require said read operation, means for monitoring said memory access commands on said system bus issued by one of said at least one external bus master to Cause said microprocessor to perform an inquiry of said internal write-back cache, means for temporarily transferring mastership of said system bus from said one of said at least one external bus master to said microprocessor to allow said microprocessor to write-back data from said internal write-back cache to said main memory, said means for temporarily transferring mastership further including means for causing said one of said at least one external bus master to remain in a wait state until said microprocessor writes said data to said main memory, said means for updating said status further serving to invalidate one of said plurality of cache lines where said data is written-back to a location in said main memory also contained in said cache memory, and means for controlling said tri-state condition of said bi-directional buffer, said cache controller serving to provide data from said external cache memory to said one of said microprocessor and at least one bus master, wherever possible, based upon said status of said selected one or more of said plurality of cache lines and alternatively serving to allow said main memory to respond to said memory access command from one of said microprocessor and at least one external bus master and controlling said write operation into said selected one or more of said plurality of cache lines contemporaneously therewith.

* * * * *

UNITED STATES PATENT AND TRADEMARK OFFICE
CERTIFICATE OF CORRECTION

PATENT NO. : 5,485,592
DATED : January 16, 1996
INVENTOR(S) : Tim Y. T. Lau

It is certified that error appears in the above-indentified patent and that said Letters Patent is hereby corrected as shown below:

| | |
|---|---|
| Col. 10, Line 52 | Delete "$2" and insert instead -- S2 --. |
| Col. 10, Line 59 | Delete "TO" and insert instead -- TO --. |
| Col. 11, Line 4 | Delete "TEMPO" and insert instead -- TEMPO --. |
| Col. 35, Line 24 | Delete "An" and insert instead -- in --. |
| Col. 36, Line 22 | Between "wait asserting" insert -- by --. |
| Col. 36, Line 62 | Delete "write,back" and insert instead -- write-back --. |
| Col. 38, Line 11 | Delete "Cause" and insert instead -- cause --. |

Signed and Sealed this

Twenty-fifth Day of February, 1997

Attest:

BRUCE LEHMAN

*Attesting Officer*   *Commissioner of Patents and Trademarks*